March 17, 1953  F. N. ROTHACKER  2,632,160
RADAR RANGE SYSTEM
Filed Oct. 1, 1949
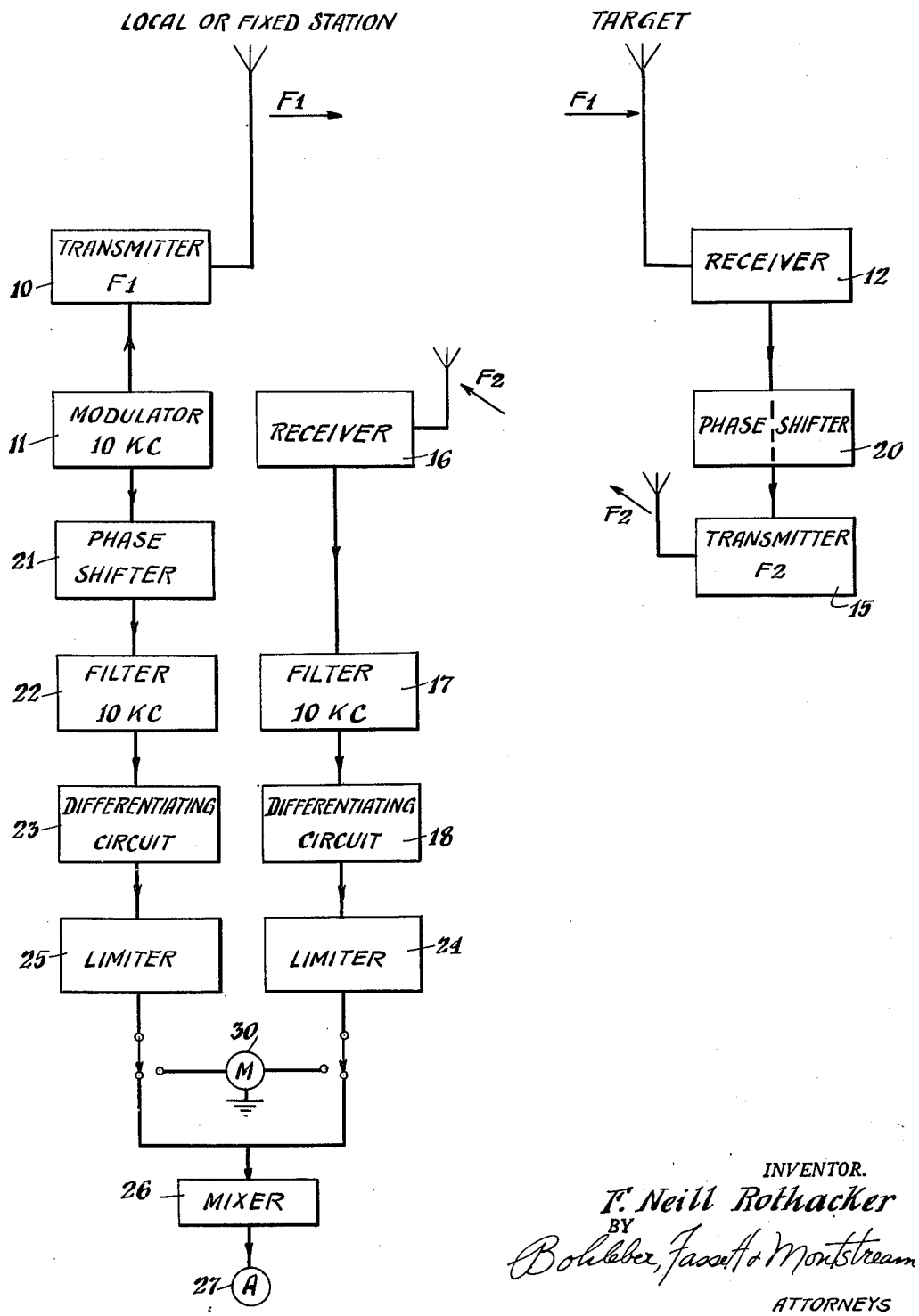
INVENTOR.
F. Neill Rothacker
BY
Bohleber, Fassett & Montstream
ATTORNEYS

UNITED STATES PATENT OFFICE 2,632,160

RADAR RANGE SYSTEM

Francis Neill Rothacker, Rye, N. Y., assignor to H. M. R. Electronics, Incorporated, New Canaan, Conn., a corporation of Connecticut Application October 1, 1949, Serial No. 119,045

9 Claims. (Cl. 343—12)

The invention relates to a radar range system by means of which the distance between a target in fixed position or in motion and a fixed point or local station may be accurately determined. The invention also relates to the shore installation alone of the complete system. The radar range system has general applicability although it is intended primarily for determining the distance between a target such as a ship or aeroplane making an oil or other survey and a fixed point which is the location of a radar transmitting station which transmits the initial signal.

It is an object of the invention to construct a radar range system which is simple yet accurately determines for survey purposes, the distance between a target and a fixed point.

Another object of the invention is to construct a radar range system using an audio frequency in the determination of the distance from a fixed position.

Another object is to construct a radar range system which combines a local generated and differentiated pulse and a reflected differentiated pulse to produce a single pulse whose width is proportional to twice the distance between target and the fixed station and measuring the width thereof or current flow during the combined pulse period for determination of the distance between the two points.

Another object is to utilize the distance or phase separation between differentiated audio pulses from the fixed station and those returned from the target as a measure of the distance therebetween.

A still further object is to construct a local transmitting and receiving mechanism as a part of the complete radar system.

Another object is to provide a new method of determining the distance between a target and a fixed station by combining a differentiated audio local signal with a differentiated audio reflected signal.

Other objects of the invention will be more apparent from the following description when taken in connection with the accompanying drawing illustrating a preferred embodiment of the invention in which the figure is a block diagram of the system.

The radar system includes a fixed station such as on shore, an anchored ship and the like, having a transmitting and receiving installation and a target having a receiving and transmitting installation which target usually is in motion. The system includes a transmitter 10 which transmits a carrier frequency $F_1$ which for best results exceeds twenty times the modulating frequency used and which carrier frequency is modulated by an audio frequency such as 10 kilocycles generated by a modulator 11. The modulating frequency may range from a practical or economic standpoint, that is the cost of the units making up the system, from 60 cycles up to 20,000 cycles the general rule being that the shorter the distance the higher the frequency that should be used. The range system measures the distance between the fixed station and the target and at the same time the azimuth of the target is noted or recorded in order to locate or fix the location of the target throughout its movement. The carrier frequency may be amplitude or frequency modulated as desired for both $F_1$ and $F_2$.

The target which may be a ship, aeroplane or other movable vehicle carries a receiver 12 which receives and demodulates the modulated signal $F_1$. The target also carries a transmitter 15 which takes the received demodulated or audio signal and retransmits it on a carrier frequency $F_2$ which in practice will be at least at a frequency about 5% different from the frequency $F_1$ in order to avoid interference between the two carrier frequencies. The retransmitted signal is picked up by a receiver 16 at the fixed station. The receiver 16 demodulates the received retransmitted signal and the audio frequency passes through a tuned filter 17 which eliminates distortion in the audio signal. The audio signal then passes to a differentiating circuit 18 connected therewith.

A phase shifter is provided in the circuit to shift the phase of one low frequency relatively to the other including the transmitted low frequency or the local low frequency. When the phase shifter is in the local circuit, it is connected with the modulator 11 and the phase shifter 21 takes the form of a delay network. The delay network is set to provide a phase shift which is equal to the time delay in the transmitter 10, the receiver 12, retransmitter 15 and receiver 16. In other words the signal delay through these elements are in addition to the time for the signal to pass between the fixed station and the target and return, which time is proportional to twice the distance between the two stations. This time delay can be determined by a test of these units at zero distance which time delay is set into the phase shifter 21 and compensates for all time delays between the modulator 11 and the output of the receiver 16, or the output of the filter 17 in the event a like filter 22 is not provided for the local signal, not arising from the distance between the fixed station and target. At zero distance the meter, to be described hereinafter, should read zero and the time delay circuit is adjusted until the meter reads zero. An adjustable phase shifter may be located on the target i. e. with the target elements of the system if desired, in which case a phase shifter 21 of excess phase shift is provided at the fixed station, and an adjustable phase shifter 20 is located at the target.

The phase shifter or delay network 21 is connected with a tuned filter 22 which is tuned to the audio or low frequency for the elimination of distortion. It will be observed therefore that any phase difference in the signal received by the filter 17 and the local signal received by the filter 22 is a function of or proportional to twice the distance between the fixed station and the target. The local low frequency signal passes from the tuned filter 22 to a differentiating circuit 23. Preferably each differentiating circuit is connected with a limiter 24 and 25 which removes the peak from each pulse and makes the pulses of equal amplitude which improves the accuracy of the system. That the amplitudes of the pulses are equal can be determined or tested by switching in a meter 30 to the output of one limiter and then the other and adjusting one until the outputs are the same. The limiters also select one of the positive or negative pulses from its respective differentiating circuit and may amplify the same if desired. The principal purpose of the differentiating circuit is to increase the ratio of time change between local and transmitted signals with respect to the duration of the transmitted signal or pulse.

The outputs of the two differentiating circuits, or the limiters, if provided, are connected together to the input of a mixer 26 which produces a single pulse, combining the two pulses from the differentiating circuits 18 and 23, the increased width of which, relative to a single pulse, is proportional to twice the distance between the fixed station and the target. The width of the combined pulse is measured by a direct current meter 27 the reading of which is proportional to twice the distance between the target and the fixed station. The meter can be graduated on the basis of half the pulse increment and hence give a direct reading of the distance between the target and the fixed station or the meter itself may be a half reader. The meter preferably is of the recording type.

With a low frequency or modulating frequency of 10 kilocycles, the preferred range is two miles although it has a maximum effective range of about 10 miles. For a range system for a maximum distance or range of 100 miles between the fixed station and the target, a modulating frequency of about 1000 cycles will be used.

The invention is presented to fill a need for improvements in a radar range system and method. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A radar range system comprising a modulator generating a low frequency wave of constant frequency, a local transmitter generating a high frequency carrier wave modulated by the low frequency wave and transmitting the signal, a target receiver for receiving the transmitted signal and demodulating the same, a target transmitter generating and transmitting a carrier frequency of a different frequency and modulated by the demodulated signal, a local receiver for receiving and demodulating the received signal, a filter connected with the local receiver tuned to the low frequency wave, a differentiating circuit connected with the filter, a time delay circuit connected with the modulator and having a time delay equal to the delays of the system with the target at zero distance, a second differentiating circuit which is connected with the time delay circuit, a mixer connected to both differentiating circuits, and a current reading meter connected to the mixer and responsive to the pulses received from both differentiating circuits.

2. A radar range system as in claim 1 including a filter for the low frequency modulating wave connected between the time delay circuit and the second differentiating circuit.

3. A radar range system as in claim 1 including a limiter connected between each differentiating circuit and the mixer.

4. A radar range system as in claim 1 including a volt meter, and means to selectively connect the volt meter to the output of each limiter.

5. A radar range system comprising a modulator generating a low frequency wave of a constant frequency, a local transmitter generating and transmitting a high frequency carrier wave modulated by the low frequency wave, a local receiver for receiving and demodulating a received modulated signal, a filter connected with the local receiver tuned to the low frequency wave, a differentiating circuit connected with the filter, a time delay circuit connected with the modulator and having a time delay equal to the delay of the system with the target at zero distance, a second differentiating circuit connected with the time delay circuit, a mixer connected to both differentiating circuits, and a current meter connected to the mixer and responsive to the pulses received from both differentiating circuits.

6. A radar range system as in claim 5 including a filter for the low frequency modulating wave connected between the time delay circuit and the second differentiating circuit.

7. A radar range system as in claim 6 including a limiter connected between each differentiating circuit and the mixer.

8. A radar range system as in claim 5 including a limiter connected between each differentiating circuit and the mixer.

9. A radar range system as in claim 5 including a voltmeter, and means selectively connecting the output of each limiter to the voltmeter.

F. NEILL ROTHACKER.

REFERENCES CITED

The following references are of record in the file of this patent:

UNITED STATES PATENTS

| Number | Name | Date |
|---|---|---|
| 1,585,591 | Lowy | May 18, 1926 |
| 2,134,716 | Gunn | Nov. 1, 1938 |
| 2,391,411 | Goble | Dec. 25, 1945 |
| 2,416,895 | Bartelink | Mar. 4, 1947 |
| 2,504,975 | Grieg | Apr. 25, 1950 |
| 2,506,818 | Sziklai | May 9, 1950 |

FOREIGN PATENTS

| Number | Country | Date |
|---|---|---|
| 581,568 | Great Britain | Oct. 17, 1946 |